United States Patent
Johnson et al.

(10) Patent No.: US 7,253,674 B1
(45) Date of Patent: Aug. 7, 2007

(54) OUTPUT CLOCK PHASE-ALIGNMENT CIRCUIT

(75) Inventors: Phillip L. Johnson, Hellertown, PA (US); Gary P. Powell, Upper Macungie, PA (US); Harold N. Scholz, Allentown, PA (US)

(73) Assignee: Lattice Semicondutor Corporation, Hillsboro, OR (US)

(*) Notice: Subject to any disclaimer, the term of this patent is extended or adjusted under 35 U.S.C. 154(b) by 38 days.

(21) Appl. No.: 11/187,114

(22) Filed: Jul. 22, 2005

(51) Int. Cl.
*G06F 1/04* (2006.01)
(52) U.S. Cl. ...................... 327/296; 327/291
(58) Field of Classification Search ............. None
See application file for complete search history.

(56) References Cited

U.S. PATENT DOCUMENTS

| | | | | |
|---|---|---|---|---|
| 5,438,254 A * | 8/1995 | Ho et al. | ............ | 324/76.82 |
| 5,822,596 A * | 10/1998 | Casal et al. | ............ | 713/322 |
| 6,463,013 B1 * | 10/2002 | Liu et al. | ............ | 368/155 |
| 6,882,229 B1 * | 4/2005 | Ho et al. | ............ | 331/1 A |
| 6,894,551 B2 * | 5/2005 | Johnson | ............ | 327/258 |
| 2004/0027181 A1 * | 2/2004 | Watanabe | ............ | 327/156 |

* cited by examiner

*Primary Examiner*—Cassandra Cox
(74) *Attorney, Agent, or Firm*—Steve Mendelsohn

(57) ABSTRACT

A clock generator has a reset circuit and (at least) two dividers, where each divider divides a reference clock signal by a divisor value to generate an output clock signal. The reset circuit generates reset signals for the dividers, where the reset signals are delayed relative to one another by a selected number of reference clock cycles, such that the dividers generate output clock signals having a desired phase offset between them.

24 Claims, 3 Drawing Sheets

OUTPUT CLOCK PHASE-ALIGNMENT CIRCUIT

TECHNICAL FIELD

The present invention relates to electronics and, more particularly, to circuits for generating clock signals.

BACKGROUND

As frequencies increase inside integrated circuits, clock alignment becomes more and more critical. Often, it is desired to move the phase of one clock from that of another clock by a defined amount. This is typically done by using different phases of a multiple-stage oscillator, but this limits the resolution of the phase offset to the number of stages in the oscillator.

SUMMARY

In one embodiment, the present invention is a method for generating two or more output clock signals. A second reset signal is delayed relative to a first reset signal based on a specified number of reference clock cycles. A first reference clock signal is divided based on a first divisor value to generate a first output clock signal based on the first reset signal. A second reference clock signal is divided based on a second divisor value to generate a second output clock signal based on the second reset signal, wherein phase offset between the first and second output clock signals is a function of the specified number of reference clock cycles and at least one of the first and second divisor values.

In another embodiment, the present invention is a clock generator for generating two or more output clock signals. The clock generator comprises first and second divider and a reset circuit. The first divider divides a first reference clock signal based on a first divisor value to generate a first output clock signal, and the second divider divides a second reference clock signal based on a second divisor value to generate a second output clock signal. The reset circuit generates a first reset signal for resetting the first divider and a second reset signal for resetting the second divider, wherein the second reset signal is delayed relative to the first reset signal based on a specified number of reference clock cycles, and phase offset between the first and second output clock signals is a function of the specified number of reference clock cycles and at least one of the first and second divisor values.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

Figure 1:
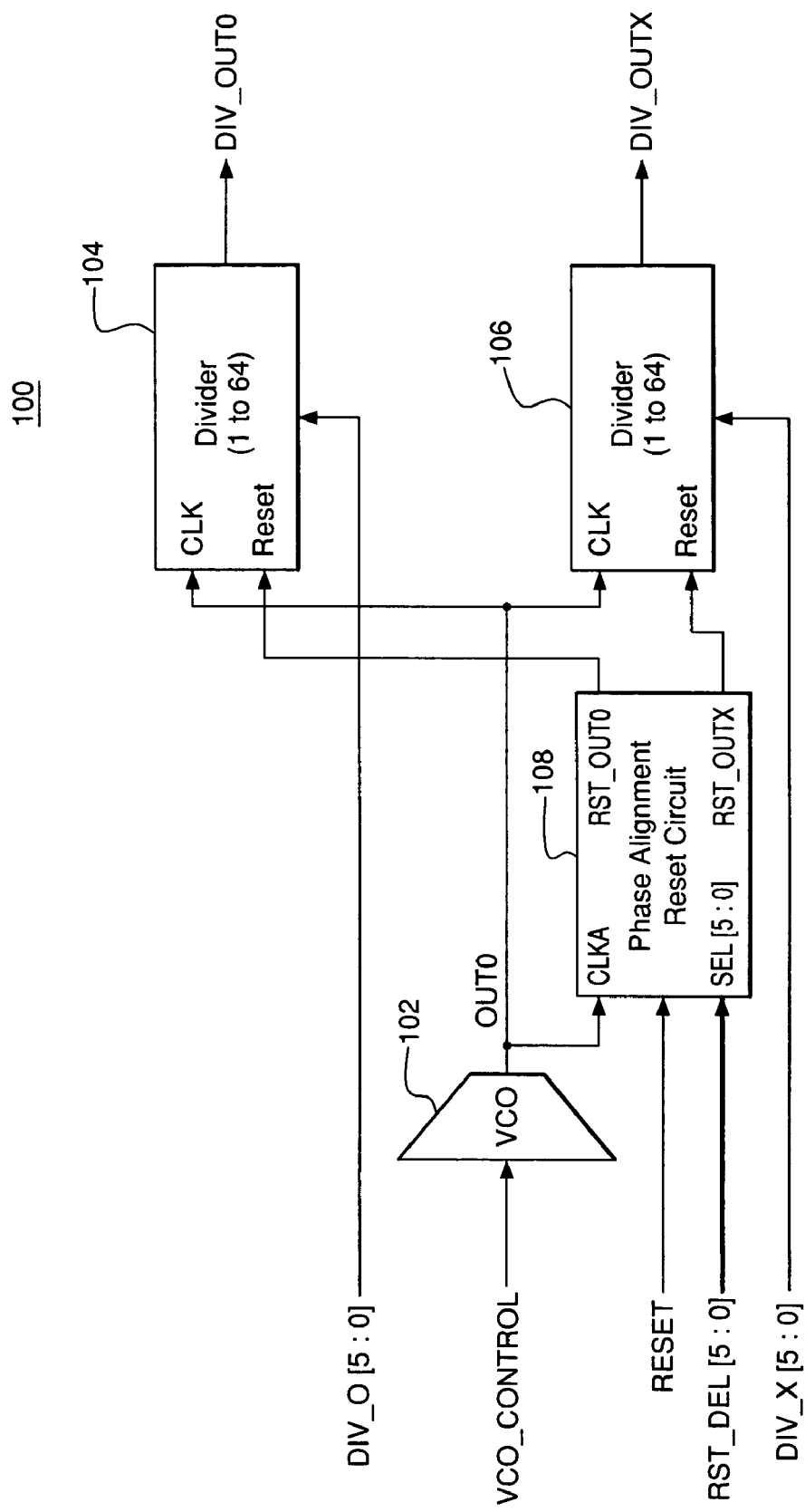
FIG. 1 is a block diagram of a clock generator according to one embodiment of the present invention.

FIG. 1 is a block diagram of a clock generator 100 according to one embodiment of the present invention. Clock generator 100 includes voltage-controlled oscillator (VCO) 102, dividers 104 and 106, and phase-alignment/reset circuit 108. Clock generator 100 generates two output clock signals DIV_OUT0 and DIV_OUTX have a desired phase offset between them.

In particular, VCO 102 receives a voltage control signal VCO_CONTROL and generates a reference clock signal OUT0, whose frequency is based on the magnitude of VCO_CONTROL. Reference clock signal OUT0 is applied to the clock inputs CLK of both dividers 104 and 106 as well as to the clock input CLKA of circuit 108. Divider 104 divides one copy of reference clock OUT0 by a divisor value between 1 and 64, as specified by 6-bit divider control signal DIV_0, to generate output clock DIV_OUT0. Similarly, divider 106 divides another copy of reference clock OUT0 by a divisor value between 1 and 64, as specified by 6-bit divider control signal DIV_X, to generate output clock DIV_OUTX, where DIV_X and DIV_0 may have the same or different values.

In addition to reference clock OUT0, phase-alignment/reset circuit 108 also receives a reset signal RESET and a 6-bit reset delay control signal RST_DEL. Circuit 108 generates divider reset signals RST_OUT0 and RST_OUTX, which are applied to the reset inputs of dividers 104 and 106, respectively, where RST_OUTX is delayed in time relative to RST_OUT0 by the number of cycles of reference clock OUT0 specified by the value of reset delay control signal RST_DEL. As such, divider 106 gets reset RST_DEL*$P_{VCO}$ seconds after divider 104 gets reset, where $P_{VCO}$ is the period of reference clock OUT0 in seconds. As a result, when DIV_0=DIV_X, the phase of output clock DIV_OUTX will lag the phase of output clock DIV_OUT0 by RST_DEL*(2π/DIV_X) radians. For example, if RST_DEL=1 and DIV_X=4, then output clock DIV_OUTX will lag output clock DIV_OUT0 by π/2 radians (i.e., 90 degrees). Other reset delay values and other divisor values can be selected to achieve different phase offsets between DIV_OUT0 and DIV_OUTX.

Figure 2:
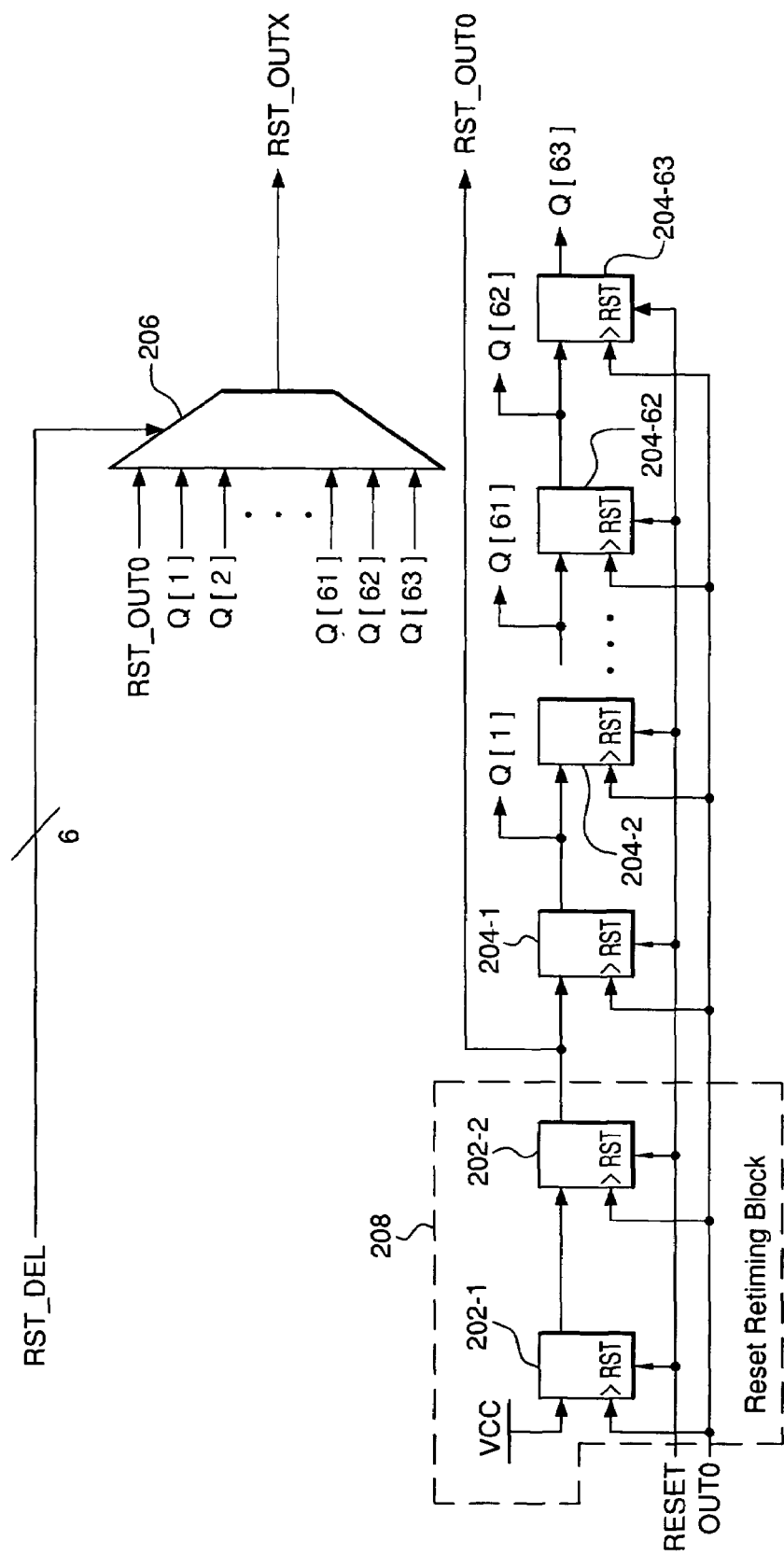
FIG. 2 is a schematic diagram of the phase-alignment/reset circuit of FIG. 1.

FIG. 2 is a schematic diagram of phase-alignment/reset circuit 108 of FIG. 1. Circuit 108 includes a series of 65 flip-flops (202-1, 202-2, 204-1, 204-2, ..., 204-62, 204-63) and a (64×1) multiplexer 206. Each flip-flop in the series delays propagation of a rising (or falling) edge in the reset signal to the next flip-flop by one cycle of reference clock OUT0. The first two flip-flops 202-1 and 202-2 in the series form reset retiming block 208, which provides retiming of the reset signal RESET to reference clock OUT0. The output of reset retiming block 208 is divider reset signal RST_OUT0 for divider 104 of FIG. 1. RST_OUT0 is also applied to flip-flop 204-1 and to the 0$^{th}$ input of mux 206.

Each of flip-flops 204-$i$ generates and applies a different delayed version Q[i] of the reset signal to the i$^{th}$ input of mux 206, where Q[i] is delayed by i cycles of reference clock OUT0 relative to RST_OUT0.

Based on the value of 6-bit reset delay control signal RST_DEL, mux 206 selects one of its 64 received signals (RST_OUT0, Q[1], Q[2], ..., Q[63]) as divider reset signal RST_OUTX for divider 106 of FIG. 1. Note that additional circuitry (not shown) may be needed to ensure that the two divider reset signals RST_OUT0 and RST_OUTX are synchronized for simultaneous application to dividers 104 and 106, respectively, to take into account routing-delay differences and the delay added by mux 206. Depending on the particular implementation, such additional circuitry may include a "dummy" mux placed in the RST_OUT0 path.

Figure 3:
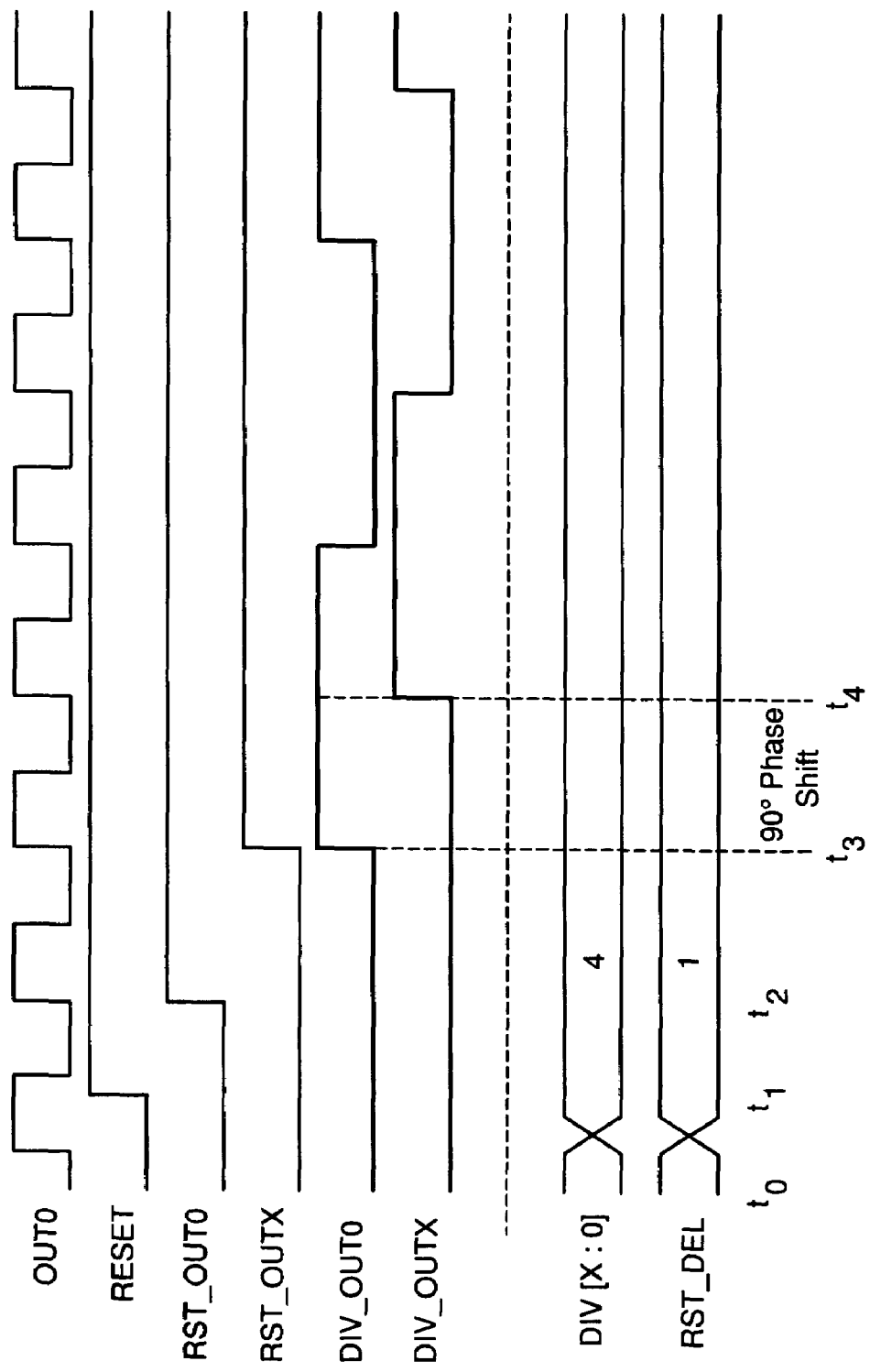
FIG. 3 shows a timing diagram illustrating the processing of the clock generator of FIG. 1 for one exemplary situation.

FIG. 3 shows a timing diagram illustrating the processing of clock generator 100 of FIG. 1 for one exemplary situation. In this particular example, the two divisor values (DIV_0 and DIV_X) are both 4 and the reset delay value (RST_DEL) is 1. A value of 1 for reset delay signal RST_DEL implies that mux 206 of FIG. 2 will select Q[1] for divider reset signal RST_OUTX, where RST_OUTX will lag RST_OUT0 by one clock cycle (i.e., 360 degrees) of reference clock OUT0. With divisor values of 4, this implies that output clock DIV_OUTX should lag output clock DIV_OUT0 by 90 degrees.

As shown in FIG. 3, at the start of this timing diagram (i.e., time t0) (and for a sufficient amount of time prior to time t0), reset signal RESET is low, resulting in both divider reset signals RST_OUT0 and RST_OUTX being low, and therefore both output clocks DIV_OUT0 and DIV_OUTX also remaining low (i.e., off).

At time t1, reset signal RESET goes high. This, in turn, causes RST_OUT0 to go high at the next rising edge of reference clock OUT0 at time t2. (Note that this exemplary timing diagram ignores the 2-cycle delay imposed by reset retiming block 208 of FIG. 2.) RST_OUT0 going high resets divider 104 of FIG. 1, which begins to generate output clock DIV_OUT0 at the next rising edge of reference clock OUT0 at time t3, where the period of DIV_OUT0 is four times the period of OUT0 due to the applied divisor value DIV_0 of 4.

With Q[1] already selected by mux 206 as divider reset signal RST_OUTX (due to the existing value of 1 for RST_DEL), the rising edge of RST_OUT0 is propagated through flip-flop 204-1 and mux 206 after being delayed by one cycle of reference clock OUT0 as a rising edge of divider reset signal RST_OUTX at time t3. RST_OUTX going high resets divider 106 of FIG. 1, which begins to generate output clock DIV_OUTX at the next rising edge of reference clock OUT0 at time t4, where the period of DIV_OUT4 is also four times the period of OUT0 do to the applied divisor value DIV_X of 4. As shown in FIG. 3, the phase offset between output clocks DIV_OUT0 and DIV_OUTX is 90 degrees, as expected.

Although the present invention has been described in the context of a clock generator in which a VCO is used to generate the reference clock signal, the present invention can also be implemented using other suitable types of circuits to generate the reference clock signal.

Although the present invention has been described in the context of a clock generator in which both dividers receive the same reference clock signal, the present invention can also be implemented in the context of dividers that received different reference clock signals (e.g., different outputs from a multi-phase VCO).

Although the present invention has been described in the context of a phase-alignment/reset circuit having a series of flip-flops, the present invention can also be implemented using other suitable types of devices for delaying the reset signal.

The present invention has been described in the context of a clock generator having two dividers, each of which can divide its input clock by any integer value from 1 to 64, and a phase-alignment/reset circuit that can generate any reset delay of from 0 to 63 reference clock cycles in one-clock-cycle increments. In general, the present invention can be implemented using integer or fractional dividers having any desired divisor ranges (including two different ranges for the two dividers) and a phase-alignment/reset circuit capable of generating any desired range of reset delays with increments equal to or different from one reference clock cycle. Moreover, the present invention can be implemented with any number ($N \geq 2$) of dividers, where the phase-alignment/reset circuit has a multiplexer analogous to mux 206 of FIG. 2 for each of at least N−1 of the N dividers.

The present invention may be implemented as circuit-based processes, including possible implementation as a single integrated circuit (such as an ASIC or an FPGA), a multi-chip module, a single card, or a multi-card circuit pack.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A method for generating two or more output clock signals, the method comprising:
   receiving a control signal corresponding to a specified number of reference clock cycles, wherein the control signal has any one of a plurality of different values;
   delaying a second reset signal relative to a first reset signal based on the specified number of reference clock cycles;
   dividing a first reference clock signal based on a first divisor value to generate a first output clock signal based on the first reset signal; and
   dividing a second reference clock signal based on a second divisor value to generate a second output clock signal based on the second reset signal, wherein (1) the specified number of reference clock cycles is independent of the first and second divisor values and (2) phase offset between the first and second output clock signals is a function of the specified number of reference clock cycles and at least one of the first and second divisor values.

2. The invention of claim 1, wherein the first reference clock signal is the second reference clock signal.

3. The invention of claim 1, wherein:
   the first and second reset signals are generated by a reset circuit based on an input reset signal;
   the first output clock signal is generated by a first divider; and
   the second output clock signal is generated by a second divider.

4. The invention of claim 3, wherein at least one of the first and second reference clock signals is generated by a voltage-controlled oscillator.

5. The invention of claim 3, wherein:
   the reset circuit comprises a multiplexer and a series of delay elements;
   the input reset signal is applied to a first delay element in the series;
   the first reset signal is output from one of the delay elements in the series; and the multiplexer receives outputs from two or more of the delay elements in the series and selects one of the delay element outputs as the second reset signal based on the received control signal.

6. The invention of claim 5, wherein the delay elements are flip-flops.

7. The invention of claim 5, wherein:
a first set of delay elements in the series provides a reset retiming function; and
a second set of delay elements in the series provides inputs to the multiplexer.

8. The invention of claim 1, wherein the method is implemented by a single integrated circuit.

9. A clock generator for generating two or more output clock signals, the clock generator comprising:
a first divider adapted to divide a first reference clock signal based on a first divisor value to generate a first output clock signal; and
a second divider adapted to divide a second reference clock signal based on a second divisor value to generate a second output clock signal; and
a reset circuit adapted to (1) receive a control signal corresponding to a specified number of reference clock cycles, wherein the control signal has any one of a plurality of different values, and (2) generate a first reset signal for resetting the first divider and a second reset signal for resetting the second divider, wherein:
the specified number of reference clock cycles is independent of the first and second divisor values;
the second reset signal is delayed relative to the first reset signal based on the specified number of reference clock cycles; and
phase offset between the first and second output clock signals is a function of the specified number of reference clock cycles and at least one of the first and second divisor values.

10. The invention of claim 9, wherein the first reference clock signal is the second reference clock signal.

11. The invention of claim 9, further comprising a reference clock generator adapted to generate the first and second reference clock signals.

12. The invention of claim 11, wherein the reference clock generator is a voltage-controlled oscillator.

13. The invention of claim 9, wherein the reset circuit is adapted to generate the first and second reset signals based on an input reset signal.

14. The invention of claim 13, wherein:
the reset circuit comprises a multiplexer and a series of delay elements;
a first delay element in the series is adapted to receive the input reset signal;
one of the delay elements in the series is adapted to output the first reset signal; and
the multiplexer is adapted to receive outputs from two or more of the delay elements in the series and select one of the delay element outputs as the second reset signal based on the received control signal.

15. The invention of claim 14, wherein the delay elements are flip-flops.

16. The invention of claim 14, wherein:
a first set of delay elements in the series is adapted to provide a reset retiming function; and
a second set of delay elements in the series is adapted to provide inputs to the multiplexer.

17. The invention of claim 9, wherein the clock generator is part of a single integrated circuit.

18. An integrated circuit having a clock generator for generating two or more output clock signals, the clock generator comprising:
a first divider adapted to divide a first reference clock signal based on a first divisor value to generate a first output clock signal; and
a second divider adapted to divide a second reference clock signal based on a second divisor value to generate a second output clock signal; and
a reset circuit adapted to (1) receive a control signal corresponding to a specified number of reference clock cycles, wherein the control signal has any one of a plurality of different values, and (2) generate a first reset signal for resetting the first divider and a second reset signal for resetting the second divider, wherein:
the specified number of reference clock cycles is independent of the first and second divisor values;
the second reset signal is delayed relative to the first reset signal based on the specified number of reference clock cycles; and
phase offset between the first and second output clock signals is a function of the specified number of reference clock cycles and at least one of the first and second divisor values.

19. A method for generating two or more output clock signals, the method comprising:
delaying a second reset signal relative to a first reset signal based on a specified number of reference clock cycles;
dividing a first reference clock signal based on a first divisor value to generate a first output clock signal based on the first reset signal; and
dividing a second reference clock signal based on a second divisor value to generate a second output clock signal based on the second reset signal, wherein:
phase offset between the first and second output clock signals is a function of the specified number of reference clock cycles and at least one of the first and second divisor values;
the first and second reset signals are generated by a reset circuit based on an input reset signal;
the first output clock signal is generated by a first divider;
the second output clock signal is generated by a second divider;
the reset circuit comprises a multiplexer and a series of delay elements;
the input reset signal is applied to a first delay element in the series;
the first reset signal is output from one of the delay elements in the series; and
the multiplexer receives outputs from two or more of the delay elements in the series and selects one of the delay element outputs as the second reset signal.

20. The invention of claim 19, wherein:
a first set of delay elements in the series provides a reset retiming function; and
a second set of delay elements in the series provides inputs to the multiplexer.

21. A clock generator for generating two or more output clock signals, the clock generator comprising:
a first divider adapted to divide a first reference clock signal based on a first divisor value to generate a first output clock signal; and
a second divider adapted to divide a second reference clock signal based on a second divisor value to generate a second output clock signal; and a reset circuit adapted to generate a first reset signal for resetting the first divider and a second reset signal for resetting the second divider, wherein:

the second reset signal is delayed relative to the first reset signal based on a specified number of reference clock cycles;

phase offset between the first and second output clock signals is a function of the specified number of reference clock cycles and at least one of the first and second divisor values;

the reset circuit is adapted to generate the first and second reset signals based on an input reset signal;

the reset circuit comprises a multiplexer and a series of delay elements;

a first delay element in the series is adapted to receive the input reset signal;

one of the delay elements in the series is adapted to output the first reset signal; and the multiplexer is adapted to receive outputs from two or more of the delay elements in the series and selects one of the delay element outputs as the second reset signal.

22. The invention of claim 21, wherein:

a first set of delay elements in the series is adapted to provide a reset retiming function; and a second set of delay elements in the series is adapted to provide inputs to the multiplexer.

23. An integrated circuit having a clock generator for generating two or more output clock signals, the clock generator comprising:

a first divider adapted to divide a first reference clock signal based on a first divisor value to generate a first output clock signal; and a second divider adapted to divide a second reference clock signal based on a second divisor value to generate a second output clock signal; and a reset circuit adapted to generate a first reset signal for resetting the first divider and a second reset signal for resetting the second divider, wherein:

the second reset signal is delayed relative to the first reset signal based on a specified number of reference clock cycles;

phase offset between the first and second output clock signals is a function of the specified number of reference clock cycles and at least one of the first and second divisor values;

the reset circuit is adapted to generate the first and second reset signals based on an input reset signal;

the reset circuit comprises a multiplexer and a series of delay elements;

a first delay element in the series is adapted to receive the input reset signal;

one of the delay elements in the series is adapted to output the first reset signal; and the multiplexer is adapted to receive outputs from two or more of the delay elements in the series and selects one of the delay element outputs as the second reset signal.

24. The invention of claim 23, wherein:

a first set of delay elements in the series is adapted to provide a reset retiming function; and a second set of delay elements in the series is adapted to provide inputs to the multiplexer.

* * * * *